(12) United States Patent
Tsai et al.

(10) Patent No.: US 10,631,163 B2
(45) Date of Patent: Apr. 21, 2020

(54) LTE BASE STATION, UE AND PRE-ASSOCIATION AND PRE-AUTHENTICATION METHODS THEREOF IN WWAN-WLAN AGGREGATION

(71) Applicant: INDUSTRIAL TECHNOLOGY RESEARCH INSTITUTE, Hsinchu (TW)

(72) Inventors: Tzu-Jane Tsai, Zhubei (TW); Wei-Chen Pao, Zhubei (TW)

(73) Assignee: INDUSTRIAL TECHNOLOGY RESEARCH INSTITUTE, Hsinchu (TW)

(*) Notice: Subject to any disclaimer, the term of this patent is extended or adjusted under 35 U.S.C. 154(b) by 0 days.

(21) Appl. No.: 14/981,410

(22) Filed: Dec. 28, 2015

(65) Prior Publication Data

US 2016/0302064 A1 Oct. 13, 2016

Related U.S. Application Data

(60) Provisional application No. 62/145,001, filed on Apr. 9, 2015.

(51) Int. Cl.
*H04W 12/06* (2009.01)
*H04W 36/00* (2009.01)
(Continued)

(52) U.S. Cl.
CPC ........ *H04W 12/06* (2013.01); *H04W 12/0602* (2019.01); *H04W 36/0038* (2013.01);
(Continued)

(58) Field of Classification Search
CPC . H04W 12/04; H04W 12/06; H04W 36/0038; H04W 36/0066; H04W 84/12; H04W 88/10
(Continued)

(56) References Cited

U.S. PATENT DOCUMENTS 8,824,298 B2 9/2014 Gupta et al.
9,609,566 B2 * 3/2017 Himayat ............... H04W 36/22
(Continued)

FOREIGN PATENT DOCUMENTS

CN 201657325 U 11/2010
CN 102215530 A 10/2011
(Continued)

OTHER PUBLICATIONS

"E-UTRAN and WLAN Aggregation", 3GPP TSG RAN Meeting #64, RP-14xxxx, Jun. 10-13, 2014.
(Continued)

*Primary Examiner* — Babar Sarwar
(74) *Attorney, Agent, or Firm* — Rabin & Berdo, P.C.

(57) ABSTRACT

A Long Term Evolution (LTE) base station, a user equipment (UE) and pre-association and pre-authentication methods thereof in a WWAN-WLAN aggregation are provided. In a Carrier Aggregation, the LTE base station is a primary cell of an Evolved Node B (eNB) and a WLAN access point (AP) is a secondary cell of the eNB. In a Dual Connectivity, the LTE base station is a master eNB and the WLAN AP is a secondary eNB. The pre-association and pre-authentication method of the LTE base station comprises the following steps. A WLAN information is received from a user equipment (UE) by the LTE base station. A WLAN authentication procedure is assisted for the UE by the LTE base station. The UE is commanded to establish a WLAN link with the WLAN AP by the LTE base station.

37 Claims, 8 Drawing Sheets

(51) Int. Cl.
*H04W 12/04* (2009.01)
*H04W 88/10* (2009.01)
*H04W 84/12* (2009.01)

(52) U.S. Cl.
CPC ........ *H04W 12/04* (2013.01); *H04W 36/0069* (2018.08); *H04W 84/12* (2013.01); *H04W 88/10* (2013.01)

(58) Field of Classification Search
USPC ...... 455/412.1–414.2, 436, 44, 456.2, 552.1, 455/411; 370/328–332, 338
See application file for complete search history.

(56) References Cited

U.S. PATENT DOCUMENTS

| | | | | |
|---|---|---|---|---|
| 2002/0174335 | A1* | 11/2002 | Zhang | H04L 63/0227 713/168 |
| 2004/0114553 | A1* | 6/2004 | Jiang | H04L 63/08 370/328 |
| 2005/0060532 | A1* | 3/2005 | Dorenbosch | H04M 1/72563 713/100 |
| 2008/0130568 | A1* | 6/2008 | Gallagher | H04W 16/16 370/329 |
| 2011/0243256 | A1* | 10/2011 | Matsuoka | G06F 21/575 375/259 |
| 2013/0216043 | A1 | 8/2013 | Ginzboorg et al. | |
| 2013/0343304 | A1* | 12/2013 | Kaippallimalil | H04W 28/18 370/329 |
| 2014/0043979 | A1* | 2/2014 | Etemad | H04W 4/70 370/237 |
| 2014/0079007 | A1* | 3/2014 | Li | H04W 28/10 370/329 |
| 2014/0079022 | A1 | 3/2014 | Wang et al. | |
| 2014/0098789 | A1* | 4/2014 | Liu | H04W 76/10 370/331 |
| 2014/0181904 | A1* | 6/2014 | Craig | H04L 63/0892 726/3 |
| 2014/0369201 | A1* | 12/2014 | Gupta | H04W 4/70 370/235 |
| 2015/0049684 | A1* | 2/2015 | Kim | H04W 4/70 370/329 |
| 2015/0121490 | A1* | 4/2015 | Liu | H04W 12/04 726/6 |
| 2015/0173007 | A1 | 6/2015 | Hara et al. | |
| 2015/0215777 | A1* | 7/2015 | Sirotkin | H04W 12/04 455/411 |
| 2016/0165481 | A1* | 6/2016 | Jin | H04W 72/10 370/236 |
| 2016/0212691 | A1* | 7/2016 | Roeland | H04W 48/18 |
| 2016/0302064 | A1* | 10/2016 | Tsai | H04W 12/06 |
| 2016/0323774 | A1* | 11/2016 | Landais | H04W 12/06 |

FOREIGN PATENT DOCUMENTS

| | | |
|---|---|---|
| CN | 102696204 A | 9/2012 |
| CN | 103797888 A | 5/2014 |
| TW | I304695 B | 12/2008 |
| TW | I432039 B | 3/2014 |
| WO | 2013173988 A1 | 11/2013 |

OTHER PUBLICATIONS

"E-UTRAN and WLAN Aggregation", 3GPP TSG RAN Meeting #65, RP-141400, Sep. 9-12, 2014.
"RAN offload solutions using LTE-WLAN IP Flow Level Aggregation", 3GPP TSG RAN #65, RP-141228.
"LTE-WLAN Radio Level Integration", 3GPP TSG RAN Meeting #66, RP-141964, Dec. 8-11, 2014.
"LTE-WLAN Radio Level Integration and Interworking Enhancement", 3GPP TSG RAN Meeting RP-150504, Mar. 9-12, 2015.
"LTE-WLAN Radio Level Integration and Interworking Enhancement", 3GPP TSG RAN Meeting RP-151114, Jun. 15-18, 2015.
Taiwanese Office Action dated Oct. 18, 2016.
Taiwanese Office Action dated Feb. 24, 2017.
Chinese Office Action dated Mar. 4, 2019.
Chinese Office Action dated Jul. 23, 2019.

\* cited by examiner

LTE BASE STATION, UE AND PRE-ASSOCIATION AND PRE-AUTHENTICATION METHODS THEREOF IN WWAN-WLAN AGGREGATION

This application claims the benefit of U.S. provisional application Ser. No. 62/145,001, filed Apr. 9, 2015, the subject matter of which is incorporated herein by reference.

TECHNICAL FIELD

The disclosure relates in general to a Long Term Evolution (LTE) base station, a user equipment (UE) and pre-association and pre-authentication methods thereof in a WWAN-WLAN aggregation.

BACKGROUND

There are three types of the relationship between 3GPP and WLAN. The first one is no-coupling, that means the mobility is non-seamless. The second one is loose-coupling (3GPP TR 37.824), and IFOM (IP Flow Mobility) is used for the 3GPP/WLAN interworking. However, due to the integration point is at P-GW, it may cost a long time and cause a large overhead at mobility. The third one is tight-coupling, i.e. RAN-level Aggregation (3GPP RP-142281), and the eNB is responsible for the bearer switch/split to offload traffic to WLAN.

For the mobility issue, the authentication procedure of WLAN is lengthy, since AP selection is decided by a user equipment. The association costs tens of milliseconds and the authentication costs one to a few seconds. This is a big challenge to support seamless services, such as VoIP, in a multi-RAT of LTE/WLAN.

SUMMARY

The disclosure is directed to a Long Term Evolution (LTE) base station, a user equipment (UE) and pre-association and pre-authentication methods thereof in a WWAN-WLAN aggregation.

According to one exemplary embodiment of the present disclosure, a pre-association and pre-authentication method of a Long Term Evolution (LTE) base station in a WWAN-WLAN aggregation is provided. In a Carrier Aggregation (CA), the LTE base station is a primary cell of an Evolved Node B (eNB) and a WLAN access point (AP) is a secondary cell of the eNB. In a Dual Connectivity (DC), the LTE base station is a master eNB and the WLAN AP is a secondary eNB. The pre-association and pre-authentication method of the LTE base station comprises the following steps. A WLAN information is received from a user equipment (UE) by the LTE base station. A WLAN authentication procedure is assisted for the UE by the LTE base station. The UE is commanded to establish a WLAN link with the WLAN AP by the LTE base station.

According to another exemplary embodiment of the present disclosure, a Long Term Evolution (LTE) base station in a WWAN-WLAN Aggregation is provided. In a Carrier Aggregation (CA), the LTE base station is a primary cell of an Evolved Node B (eNB) and a WLAN access point (AP) is a secondary cell of the eNB. In a Dual Connectivity (DC), the LTE base station is a master eNB and the WLAN AP is a secondary eNB. The LTE base station is configured to receive a WLAN information from a user equipment (UE). The LTE base station is further configured to assist a WLAN authentication procedure for the UE. The LTE base station is further configured to command the UE to establish a WLAN link with the WLAN AP.

According to another exemplary embodiment of the present disclosure, a pre-association and pre-authentication method of a user equipment (UE) in a WWAN-WLAN Aggregation is provided. In a Carrier Aggregation (CA), a Long Term Evolution (LTE) base station is a primary cell of an Evolved Node B (eNB) and a WLAN access point (AP) is a secondary cell of the eNB. In a Dual Connectivity (DC), the LTE base station is a master eNB and the WLAN AP is a secondary eNB. The pre-association and pre-authentication method of the UE comprises the following steps. A command message is received from the LTE base station by the UE. A WLAN information is transferred from the UE to the LTE base station for the LTE base station to assist a WLAN authentication procedure for the UE. A WLAN link is established with the WLAN AP by the UE.

According to another exemplary embodiment of the present disclosure, a user equipment (UE) in a WWAN-WLAN Aggregation is provided. In a Carrier Aggregation (CA), a Long Term Evolution (LTE) base station is a primary cell of an Evolved Node B (eNB) and a WLAN access point (AP) is a secondary cell of the eNB. In a Dual Connectivity (DC), the LTE base station is a master eNB and the WLAN AP is a secondary eNB. The UE is configured to transfer a WLAN information to the LTE base station for the LTE base station to assist a WLAN authentication procedure for the UE. The UE is further configured to establish a WLAN link with the WLAN AP.

The above and other aspects of the disclosure will become better understood with regard to the following detailed description of the non-limiting embodiment(s). The following description is made with reference to the accompanying drawings.

DETAILED DESCRIPTION

In a WWAN-WLAN Aggregation (LWA), an user equipment (UE) is attached to a Long Term Evolution (LTE) base station, and the tight-coupled WLAN asses point (AP) is fully controlled by an Evolved Node B (eNB). Since the WLAN AP is tightly coupled with the eNB, the AP selection of WWAN-WLAN aggregation could be decided by the eNB to avoid a lengthy authentication procedure.

Figure 1:
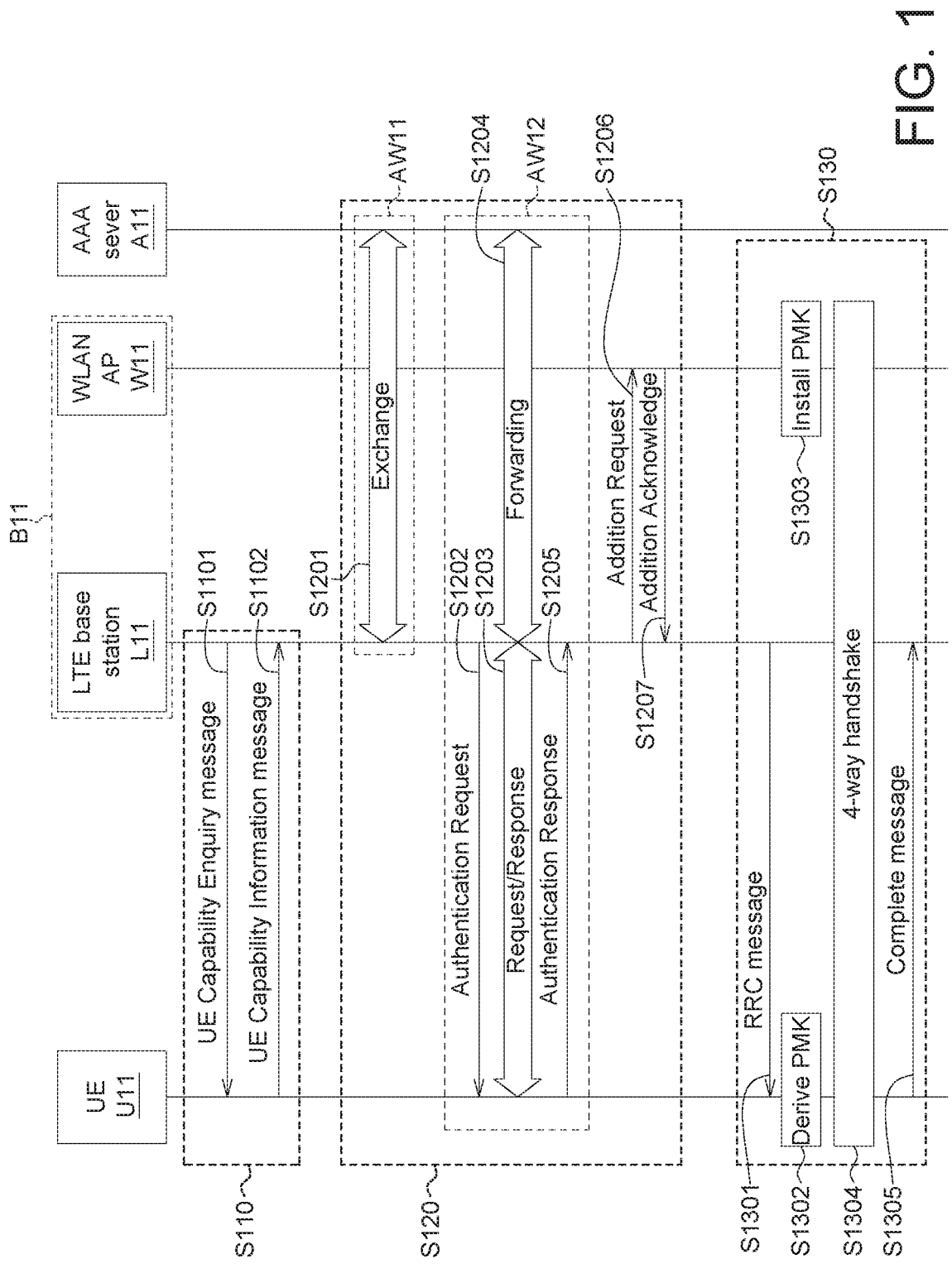
FIG. 1 illustrates a pre-association and pre-authentication method in a Carrier Aggregation (CA) of the WWAN-WLAN aggregation.

Please refer to FIG. 1, which illustrates a pre-association and pre-authentication method in a Carrier Aggregation (CA) of the WWAN-WLAN aggregation. In the Carrier Aggregation, a LTE base station L11 is a primary cell of an eNB B11 and a WLAN AP W11 is a secondary cell of the eNB B11. In this disclosure, the eNB B11 assists the authentication procedure for a UE U11 and the WLAN AP W11.

In step S110, the UE U11 transfers a WLAN information including a WLAN association information and a WLAN authentication information to LTE base station L11 which is the primary cell of the eNB B11.

In step S120, the LTE base station L11 which is the primary cell of the eNB B11 assists the WLAN authentication procedure for the UE U11. In the step S120, two alternative ways AW11 and AW12 can be chosen. In the alternative way AW11, the LTE base station L11 performs the WLAN authentication procedure; in the alternative way AW12, the LTE base station L11 assists the UE U11 to perform the WLAN authentication procedure.

In step S130, the LTE base station L11 which is the primary cell of the eNB B11 commands the UE U11 to establish a WLAN link with the WLAN AP W11.

Detail steps are described as below. In step S110, step S110 includes steps S1101 and S1102. In step S1101, the LTE base station L11 transmits a WLAN enquiry message, such as an UE Capability Enquiry message (or a radio resource control (RRC) connection reconfiguration), to the UE U11. The WLAN enquiry message comprises an indication for asking WWAN-WLAN aggregation supporting. In this step, according to the UE Capability Enquiry message, whether the LTE base station L11 and the WLAN AP W11 are tightly coupled can be known.

In step S1102, the UE U11 transmits the WLAN information, such as a UE Capability Information message (or a RRC connection reconfiguration complete message), to the LTE base station L11. The UE Capability Information message includes the WLAN association information, such as a UE identification (ID), a network interface card (NIC) information (the supported data rate and encryption type, etc.), and a response of WWAN-WLAN aggregation supporting. If the alternative way AW11 of step S120 is chosen, the UE Capability Information message further includes the WLAN authentication information, such as a network access identifier (NAI) information, such that the LTE base station L11 has enough information to directly perform the WLAN authentication procedure.

In step S120, step S120 includes the alternative ways AW11 and AW12. The alternative way AW11 includes step S1201. In step S1201 which is an Exchange step, the LTE base station L11 performs the WLAN authentication procedure according to 3GPP TS 33.402. In this alternative way AW11, the LTE base station L11 substitutes the UE U11 to execute the WLAN authentication procedure with an authentication, authorization, and accounting server (AAA) A11. After executing the WLAN authentication procedure, the LTE base station L11 obtains a master key (MK) and a pair-wise master key (PMK).

The alternative way AW12 includes steps S1202 to S1205. In step S1202, the LTE base station L11 transmits an UE request message, such as an Authentication Request, to the UE U11 to indicate the UE U11 to perform the WLAN authentication procedure with the AAA server A11. The UE request message comprises at least one of an indication of performing the WLAN authentication procedure, and an AP identification (ID).

Then, the step S1203 which is a Request/Response step and the step S1204 which is a Forwarding step are performed. Among the steps S1203 and S1204, the LTE base station L11 plays a role of an interchange between the UE U11 and the AAA server A11 for assisting the UE U11 to perform the WLAN authentication procedure according to 3GPP TS 33.402 with the AAA server A11.

In step S1205, the UE U11 transmits a UE response message, such as an Authentication Response, to the LTE base station L11 for informing the LTE base station L11 that the steps S1203 and S1204 are accomplished. The UE response message comprises at least one of an indication of the complete of performing the WLAN authentication procedure, the MK, and the PMK. In one embodiment, the step S1205 can be omitted. After executing the WLAN authentication procedure, the LTE base station L11 obtains the PMK.

In step S1206, the LTE base station L11 sends at least one of the NIC information, the MK, and the PMK to the WLAN AP W11 via a WLAN request message, such as an Addition Request. For example, the LTE base station L11 may send the NIC information and the PMK to the WLAN AP W11 via the Addition Request.

In step S1207, the LTE base station L11 gets an Association ID from the WLAN AP W11 via a WLAN response message, such as an Addition Acknowledge, if WLAN AP W11 accepts the Addition Request. The WLAN response message comprises an association identification (ID).

In step S130, step S130 includes steps S1301 to S1305. In step S1301, the LTE base station L11 sends a target AP ID, a channel information, an association ID to the UE U11 via a command message, such as a RRC message (radio resource control (RRC) connection reconfiguration), for installing the PMK, releasing, or establishing the WLAN link with the WLAN AP W11. The command message comprises at least one of the MK, an AP identification (ID) to be established, the AP identification (ID) to be released, a channel information, and an association identification (ID). In case of releasing the WLAN link with the WLAN AP W11, the LTE base station L11 sends a release request message to the WLAN AP W11, and the release request message comprises at least one of an indication to release, a AP ID, and a UE ID. If the alternative way AW11 of step S120 is chosen, the LTE base station L11 further sends the MK to the UE U11 via the RRC message, such that the UE U11 can derive the PMK in the next step S1302.

In step S1302, the UE U11 derives the PMK according to the MK. In step S1303, the WLAN AP W11 installs the PMK.

In step S1304, a 4-way handshake is performed between the UE U11 and the WLAN AP W11 via the PMK. During a handover procedure, the LTE base station L11 send a handover request message to another LTE base station, and the handover request message comprises at least one of a UE identification (ID), an AP identification (ID), a channel information identification (ID), a network access identifier (NAI) information, a network interface card (NIC) information, and a bandwidth information. The LTE base station L11 receives a handover response message from another LTE base station in response to the handover request message, and the handover response message comprises at least one of a target AP identification (ID), a channel information identification (ID), a master key (MK), an association identification (ID), and a bandwidth information.

In step S1305, the UE U11 transmits a Complete message to the LTE base station L11 to inform that the pre-association and pre-authentication method is accomplished.

Figure 2:
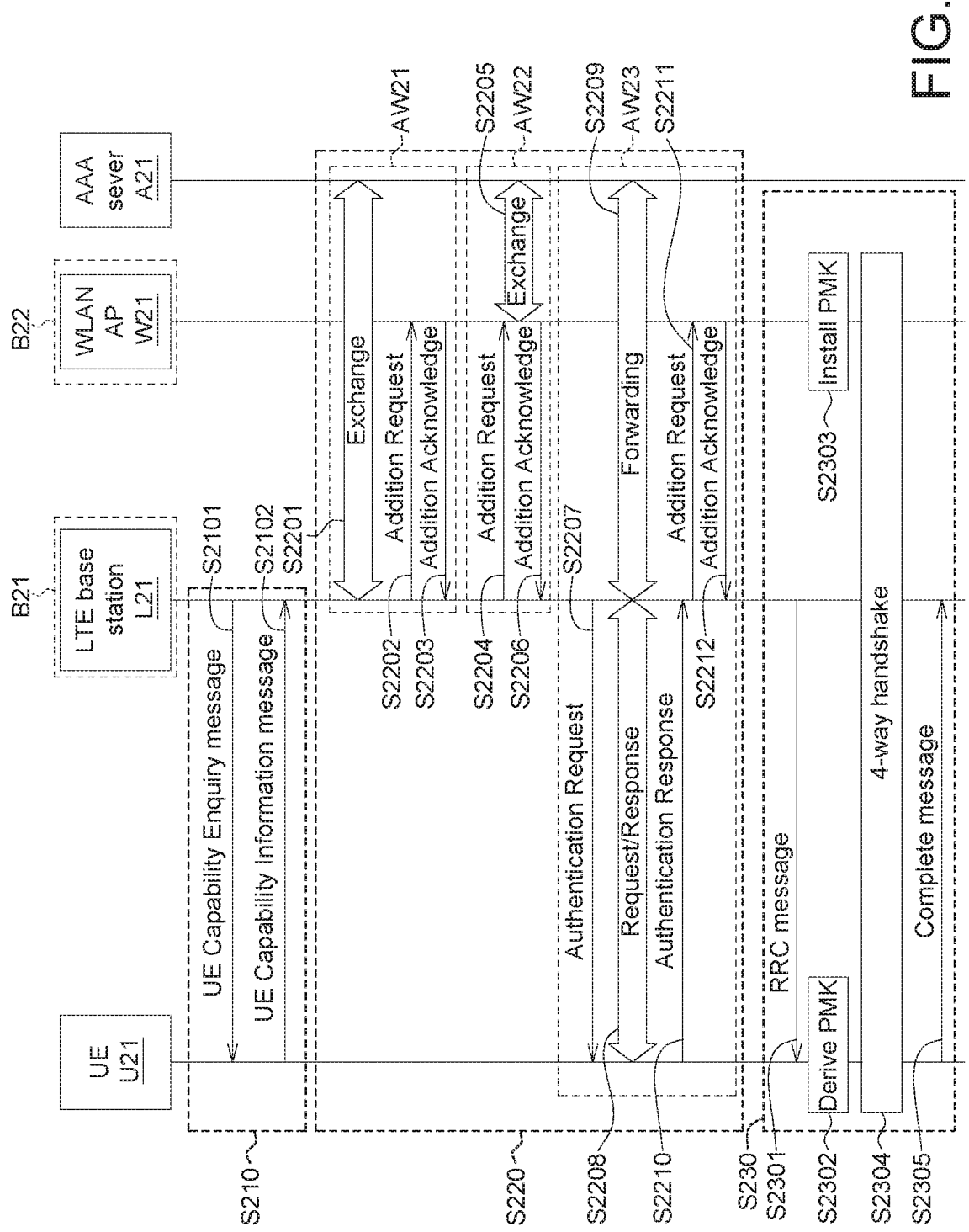
FIG. 2 illustrates a pre-association and pre-authentication method in a Dual Connectivity (DC) of the WWAN-WLAN aggregation.

Please refer to FIG. 2, which illustrates a pre-association and pre-authentication method in a Dual Connectivity (DC) of the WWAN-WLAN aggregation. In the Dual Connectivity, a LTE base station L21 is a master eNB B21 and a WLAN AP W21 is a secondary eNB B22. In this disclosure, the master eNB B21 or the secondary eNB B22 assists the authentication procedure for the UE U21 and the WLAN AP W21.

In step S210, the UE U21 transfers the WLAN information including the WLAN association information and the WLAN authentication information to LTE base station L21 which is the master eNB B21.

In step S220, the LTE base station L21 which is the master eNB B21 or the WLAN AP W21 which is the secondary eNB B22 assists the WLAN authentication procedure for the UE U21. In the step S220, three alternative ways AW21, AW22 and AW23 can be chosen. In the alternative way AW21, the LTE base station L21 performs the WLAN authentication procedure; in the alternative way AW22, the LTE base station L21 assists the WLAN AP W21 to perform the WLAN authentication procedure; in the alternative way AW23, the LTE base station L21 assists the UE U21 to perform the WLAN authentication procedure.

In step S230, the LTE base station L21 which is the master eNB B21 commands the UE U21 to establish the WLAN link with the WLAN AP W21.

Detail steps are described as below. In step S210, step S210 includes steps S2101 and S2102. In step S2101, the LTE base station L21 transmits the WLAN enquiry message, such as the UE Capability Enquiry message (or a radio resource control (RRC) connection reconfiguration), to the UE U21. The WLAN enquiry message comprises an indication for asking WWAN-WLAN aggregation supporting. In this step, according to the UE Capability Enquiry message, whether the LTE base station L21 and the WLAN AP W21 are tightly coupled can be known.

In step S2102, the UE U21 transmits the WLAN information, such as the UE Capability Information message (or a RRC connection reconfiguration complete message), to the LTE base station L21. The UE Capability Information message includes the WLAN association information, such as the UE identification (ID), the NIC information (the supported data rate and encryption type, etc.), and a response of WWAN-WLAN aggregation supporting. If the alternative way AW21 or the alternative way AW22 of step S220 is chosen, the UE Capability Information message further includes the WLAN authentication information, such as the NAI information, such that the LTE base station L21 or the WLAN AP W21 has enough information to directly perform the WLAN authentication procedure.

In step S220, step S220 includes the alternative ways AW21, AW22 and AW23. The alternative way AW21 includes steps S2201 to S2203. In step S2201 which is the Exchange step, the LTE base station L21 performs the WLAN authentication procedure according to 3GPP TS 33.402. In this alternative way AW21, the LTE base station L21 substitutes the UE U21 to execute the WLAN authentication procedure with the AAA server A21. After executing the WLAN authentication procedure, the LTE base station L21 obtains the MK and the PMK.

In step S2202, the LTE base station L21 sends the WLAN association information (e.g., NIC information) and PMK to the WLAN AP W21 via an additional Request.

In step S2203, after receiving the Additional Request, the WLAN AP W21 sends an AP ID, a bandwidth information and an association ID to the LTE base station L21 via an Addition Acknowledge, if WLAN AP W21 accepts the Addition Request.

The alternative way AW22 includes steps S2204 to S2206. In step S2204, the LTE base station L21 sends a WLAN addition message, such as the Addition Request, including the WLAN association information and the WLAN authentication information to the WLAN AP W21 to indicate the WLAN AP W21 to perform the WLAN authentication procedure with the AAA server A21 or to install the PMK. The WLAN addition message comprises at least one of an indication of performing the WLAN authentication procedure, a UE identification (ID), an AP identification (ID), a bandwidth information, the NIC information, the NAI information, the MK, and the PMK.

In step S2205, the WLAN AP W21 performs the WLAN authentication procedure according to 3GPP TS 33.402. In this step, the WLAN AP W21 substitutes the UE U21 to execute the WLAN authentication procedure with the AAA server A21. After executing the WLAN authentication procedure, the WLAN AP W21 obtains the MK and the PMK.

In step S2206, the WLAN AP W21 sends the AP ID, the bandwidth information, the association ID and the MK to the LTE base station L21 via a WLAN acknowledge message, such as the Addition Acknowledge, if WLAN AP W21 accepts the Addition Request. The WLAN acknowledge message comprises at least one of an AP identification (ID), a bandwidth information, an association identification (ID), the MK, and the PMK.

The alternative way AW23 includes steps S2207 to S2212. In step S2207, the LTE base station L21 transmits the UE request message, such as the Authentication Request, to the UE U21 to indicate the UE U21 to perform the WLAN authentication procedure with the AAA server A11. The UE request message comprises at least one of an indication of performing the WLAN authentication procedure, and an AP identification (ID).

Then, the step S2208 which is the Request/Response step and the step S2209 which is the Forwarding step are performed. Among the steps S2208 and S2209, the LTE base station L21 plays the role of the interchange between the UE U21 and the AAA server A21 for assisting the UE U21 to perform the WLAN authentication procedure according to 3GPP TS 33.402 with the AAA server A21.

In step S2210, the UE U21 transmits the UE response message, such as the Authentication Response to the LTE base station L21 for informing the LTE base station L21 that the steps S1203 and S1204 are accomplished. The UE response message comprises at least one of an indication of the complete of performing the WLAN authentication procedure, the MK, and the PMK. In one embodiment, the step S2210 can be omitted. After executing the WLAN authentication procedure, the LTE base station L21 obtains the PMK.

In step S2211, the LTE base station L21 sends at least one of the NIC information, the MK, and the PMK to the WLAN AP W21 via the WLAN request message, such as the Addition Request. For example, the LTE base station L11 may send the NIC information and the PMK to the WLAN AP W11 via the Addition Request.

In step S2212, the LTE base station L21 gets the Association ID from the WLAN AP W21 via the WLAN response message, such as the Addition Acknowledge, if WLAN AP W21 accepts the Addition Request. The WLAN response message comprises an association identification (ID).

In step S230, step S230 includes steps S2301 to S2305. In step S2301, the LTE base station L21 sends the target AP ID, the channel information, the association ID to the UE U21 via the command message, such as the RRC message (radio resource control (RRC) connection reconfiguration), for installing the PMK, releasing, or establishing the WLAN link with the WLAN AP W11. The command message comprises at least one of the MK, an AP identification (ID) to be established, the AP identification (ID) to be released, a channel information, and an association identification (ID). In case of releasing the WLAN link with the WLAN AP W11, the LTE base station L11 sends a release request message to the WLAN AP W11, and the release request message comprises at least one of an indication to release, a AP ID, and a UE ID. If the alternative way AW21 or the alternative way AW22 of step S220 is chosen, the LTE base station L21 further sends the MK to the UE U21 via the RRC message, such that the UE U21 can derive the PMK in the next step S2302.

In step S2302, the UE U21 derives the PMK according to the MK. In step S2303, the WLAN AP W21 installs the PMK.

In step S2304, the 4-way handshake is performed between the UE U21 and the WLAN AP W21 via the PMK. During a handover procedure, the LTE base station L11 send a handover request message to another LTE base station, and the handover request message comprises at least one of a UE identification (ID), an AP identification (ID), a channel information identification (ID), a network access identifier (NAI) information, a network interface card (NIC) information, and a bandwidth information. The LTE base station L11 receives a handover response message from another LTE base station in response to the handover request message, and the handover response message comprises at least one of a target AP identification (ID), a channel information identification (ID), a master key (MK), an association identification (ID), and a bandwidth information.

In step S2305, the UE U21 transmits the Complete message to the LTE base station L21 to inform that the pre-association and pre-authentication method is accomplished.

According to the steps S110 to S130 in FIG. 1 and the step S210 to S230 in FIG. 2, a mobility procedure of the WLAN AP W11, W21 could be assisted by the eNB B11, B21 or B22 to avoid the lengthy authentication procedure. Please refer to FIG. 3, which shows a case that a connection of a UE U31 is switched from a WLAN AP W31 to a WLAN AP W32. In this case, the WLAN AP W31 and the WLAN AP W32 are tightly coupled with the same LTE base station L31.

Figure 3:
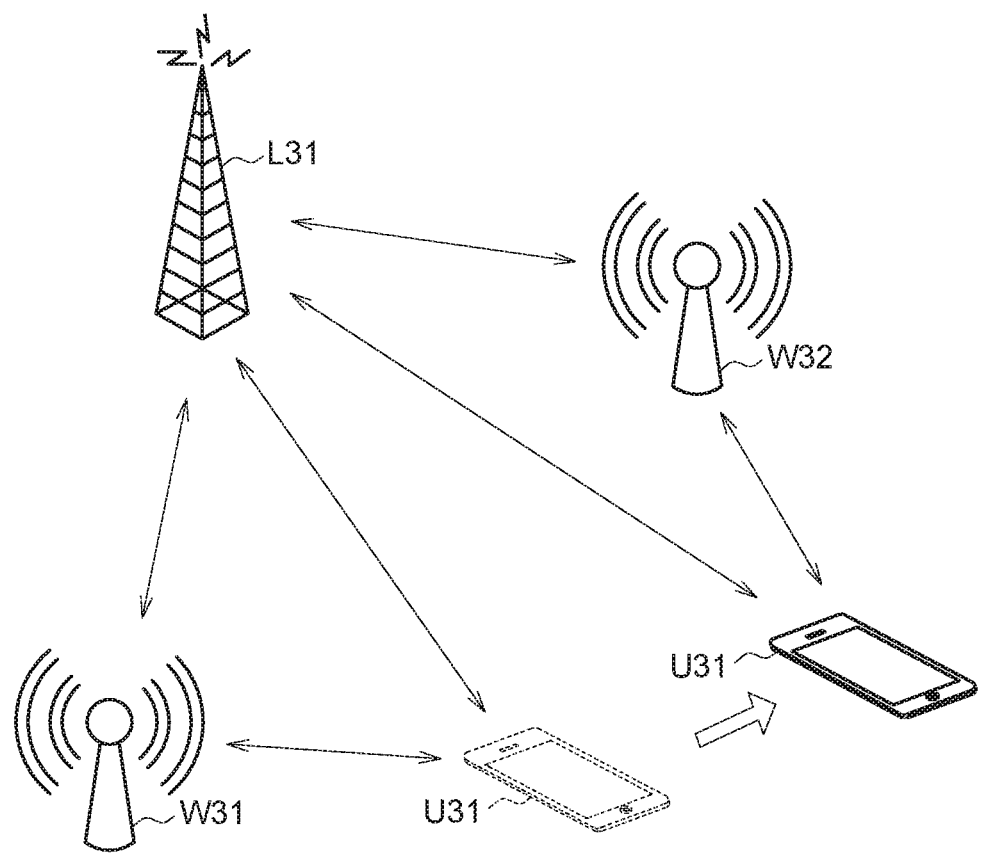
FIG. 3 shows a case that a connection of a UE is switched from a WLAN AP to another WLAN AP.
Figure 4:
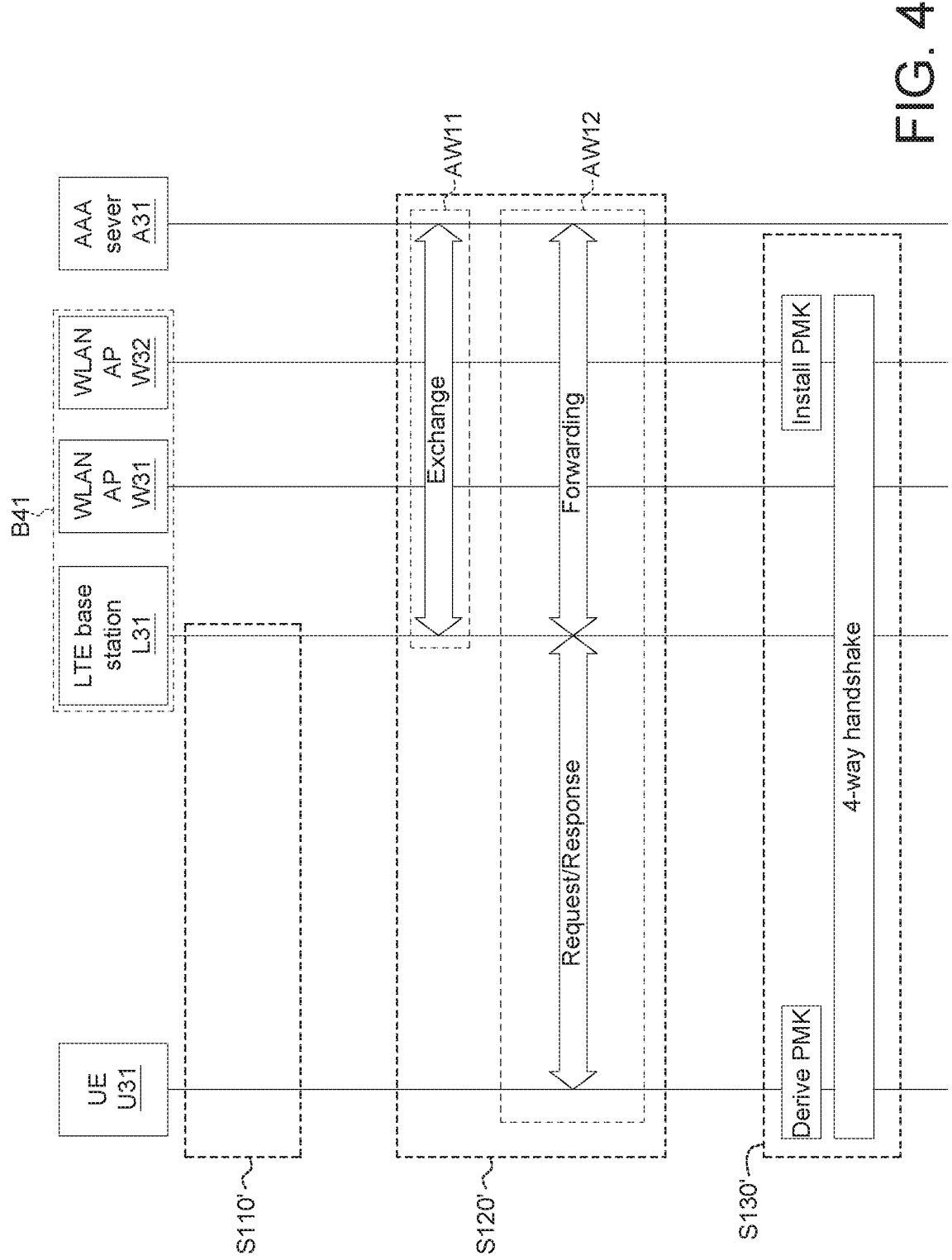
FIG. 4 shows that the mobility procedure of a WLAN AP and another WLAN AP is performed in the Carrier Aggregation.

In the case of FIG. 3, the WWAN-WLAN aggregation may be the Carrier Aggregation or the Dual Connectivity. Please refer to FIG. 4, which shows that the mobility procedure of the WLAN AP W31, W32 is performed in the Carrier Aggregation. In the Carrier Aggregation, the LTE base station L31 is a primary cell of an eNB B41, the WLAN AP W31 is a secondary cell of the eNB B41, and the WLAN AP W32 is a third cell of the eNB B41. In this disclosure, the eNB B41 assists the authentication procedure for the UE U31 and the WLAN AP W32.

In step S110', an information transfer is performed between the UE U31 and the LTE base station L31 which is the primary cell of the eNB B41.

In step S120', the LTE base station L31 which is the primary cell of the eNB B41 assists the WLAN authentication procedure for the UE U31 with an AAA server A31. In the step S120', two alternative ways AW11 and AW12 can be chosen. In the alternative way AW11, the LTE base station L31 performs the WLAN authentication procedure; in the alternative way AW12, the LTE base station L31 assists the UE U31 to perform the WLAN authentication procedure.

In step S130', the LTE base station L31 which is the primary cell of the eNB B41 commands the UE U31 to establish the WLAN link with the WLAN AP W32.

Figure 5:
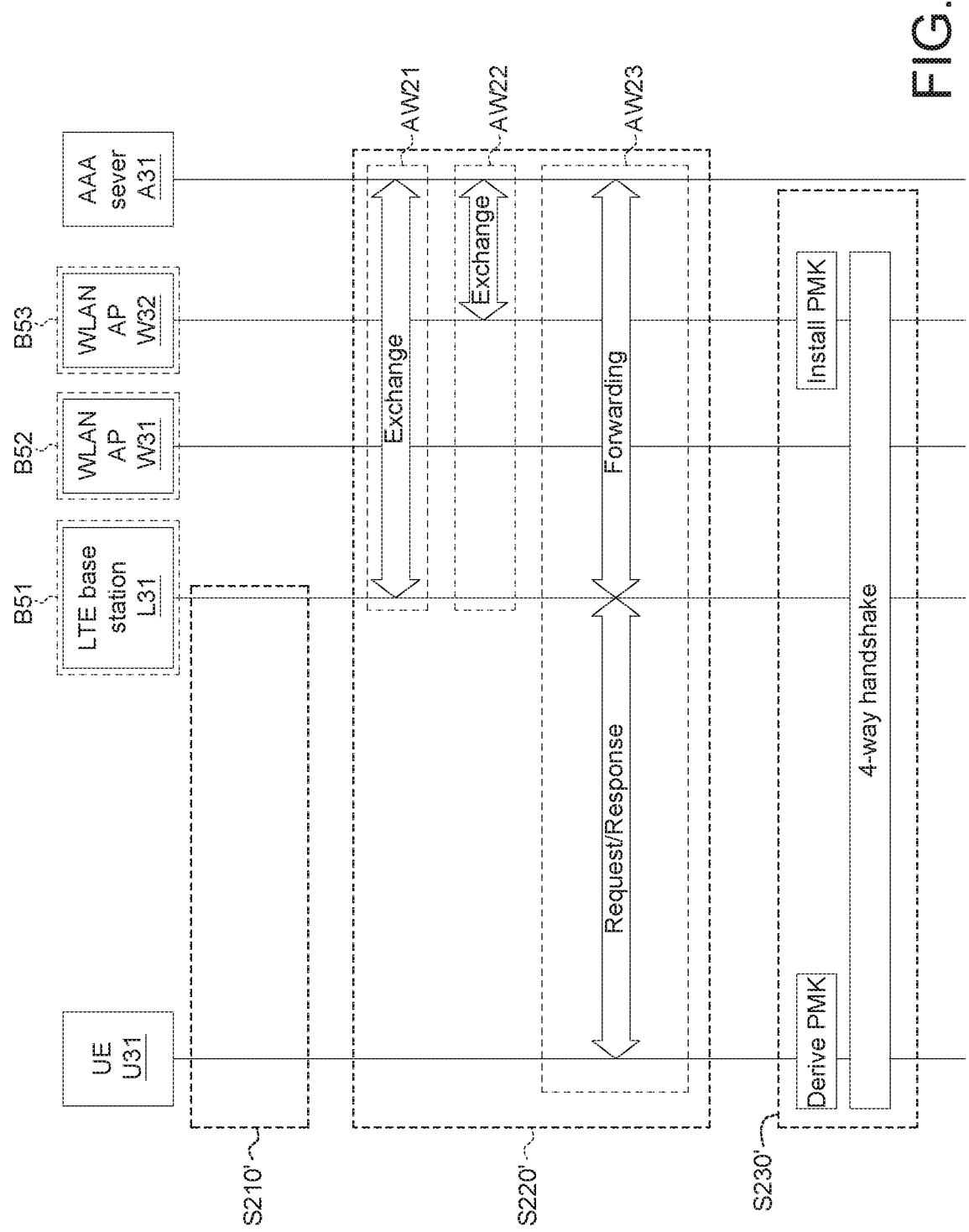
FIG. 5 shows that the mobility procedure of a WLAN AP and another WLANAP is performed in the Dual Connectivity.

Please refer to FIG. 5, which shows that the mobility procedure of the WLAN AP W31, W32 is performed in the Dual Connectivity. In the Dual Connectivity, the LTE base station L31 is a master eNB B51, the WLAN AP W31 is a secondary eNB B52, and the WLAN AP W32 is a third eNB B53. In this disclosure, the eNB B51, the eNB B52 or the eNB B53 assists the authentication procedure for the UE U31 and the WLAN AP W32.

In step S210', an information transfer is performed between the UE U31 and the LTE base station L31 which is the master eNB B51.

In step S220', the LTE base station L31 which is the master eNB B51 or the WLAN AP W32 which is the third eNB B53 assists the WLAN authentication procedure for the UE U31 with the AAA server A31. In the step S220, three alternative ways AW21, AW22 and AW23 can be chosen. In the alternative way AW21, the LTE base station L31 performs the WLAN authentication procedure; in the alternative way AW23, the LTE base station L31 assists the WLAN AP W32 to perform the WLAN authentication procedure; in the alternative way AW23, the LTE base station L31 assists the UE U31 to perform the WLAN authentication procedure.

In step S230', the LTE base station L31 which is the master eNB B51 commands the UE U31 to establish the WLAN link with the WLAN AP W32.

Figure 6:
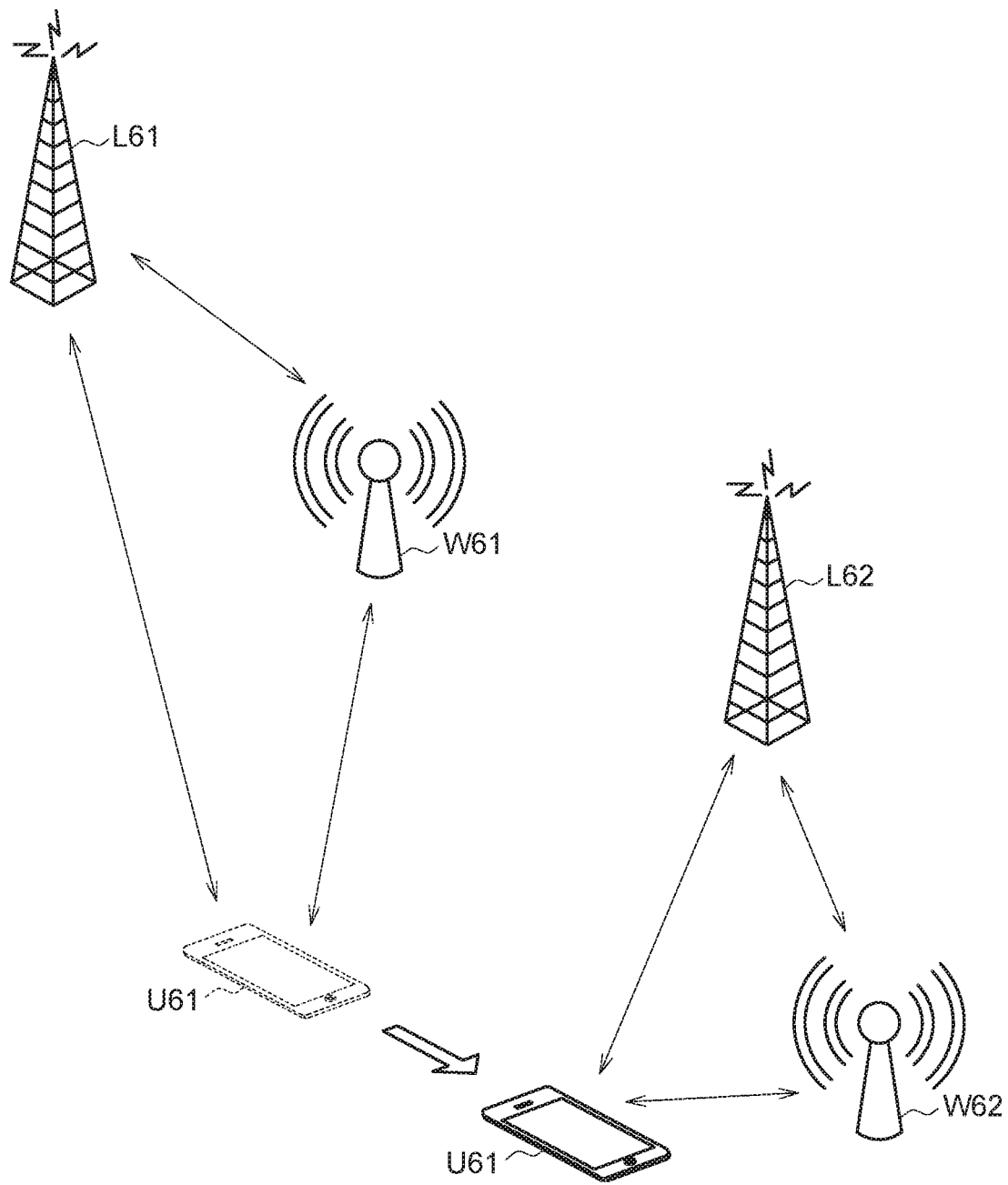
FIG. 6 shows a case that a connection of a UE is switched from a WLAN AP to another WLAN AP.

Please refer to FIG. 6, which shows a case that a connection of a UE U61 is switched from a WLAN AP W61 to a WLAN AP W62. In this case, the WLAN AP W61 and the WLAN AP W62 are tightly coupled with different LTE base stations L61 and L62 respectively.

Figure 7:
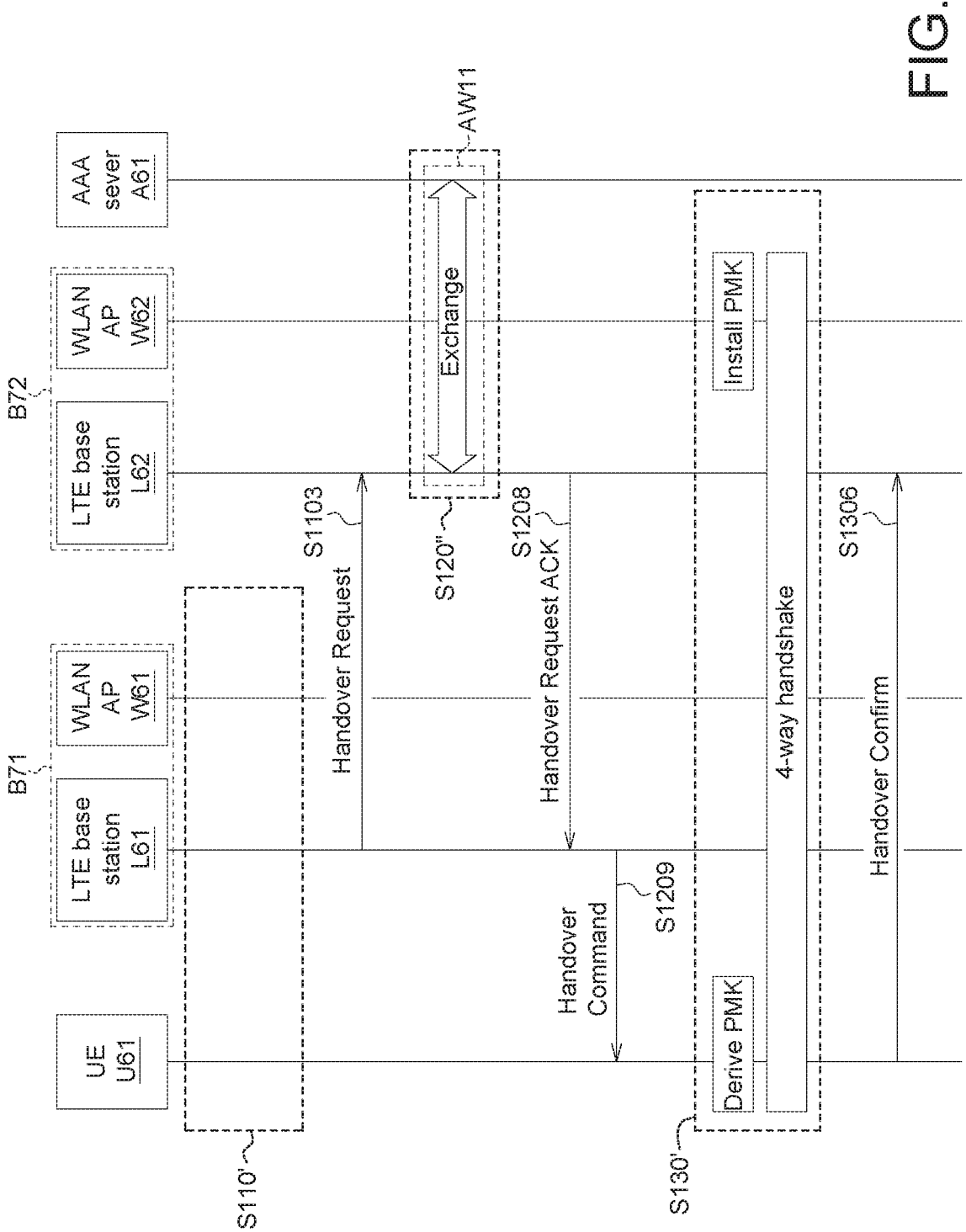
FIG. 7 shows that the mobility procedure of a WLAN AP and another WLAN AP is performed in the Carrier Aggregation.

In the case of FIG. 6, the WWAN-WLAN aggregation may be the Carrier Aggregation or the Dual Connectivity. Please refer to FIG. 7, which shows that the mobility procedure of the WLAN AP W61, W62 is performed in the Carrier Aggregation. In the Carrier Aggregation, the LTE base station L61 is a primary cell of an eNB B71, the WLAN AP W61 is a secondary cell of the eNB B71, the LTE base station L62 is a primary cell of an eNB B72, and the WLAN AP W62 is a secondary cell of the eNB B72. In this disclosure, the eNB B72 assists the authentication procedure for the UE U61 and the WLAN AP W62.

In step S110', an information transfer is performed between the UE U61 and the WLAN AP W61 which is the secondary cell of the eNB B71. Next, in step S1103, the LTE base station L61 transmits a Handover Request to the LTE base station L62. The Handover Request includes the WLAN association information and the WLAN authentication information of the UE U61, an AP ID of the WLAN AP W61, and a channel and bandwidth information. In one embodiment, if the WLAN association information and the WLAN authentication information are stored in a Mobility Management Entity (MME), then the LTE base station L62 can ask the MME for the WLAN association information and the WLAN authentication information.

In step S120'', the LTE base station L62 which is the primary cell of the eNB B72 assists the WLAN authentication procedure for the UE U61 with an AAA server A61. In the step S120'', the alternative way AW11 can be used. In the alternative way AW11, the LTE base station L62 performs the WLAN authentication procedure. Next, in step S1208, the LTE base station L62 transmits a Handover Request ACK to the LTE base station L61. The Handover Request ACK includes an AP ID of the WLAN AP W62, a channel and bandwidth information, an association ID, and the MK. Next, in step S1209, the LTE base station L61 transmits a Handover Command to the UE U61 for performing the 4-way handshake. The Handover Command includes an AP ID of the WLAN AP W62, the channel and bandwidth information, the association ID and the MK.

In step S130', the LTE base station L61 which is the primary cell of the eNB B71 commands the UE U61 to establish the WLAN link with the WLAN AP W62. Next, in step S1306, the UE U61 transmits a Handover Confirm to the LTE base station L62.

Figure 8:
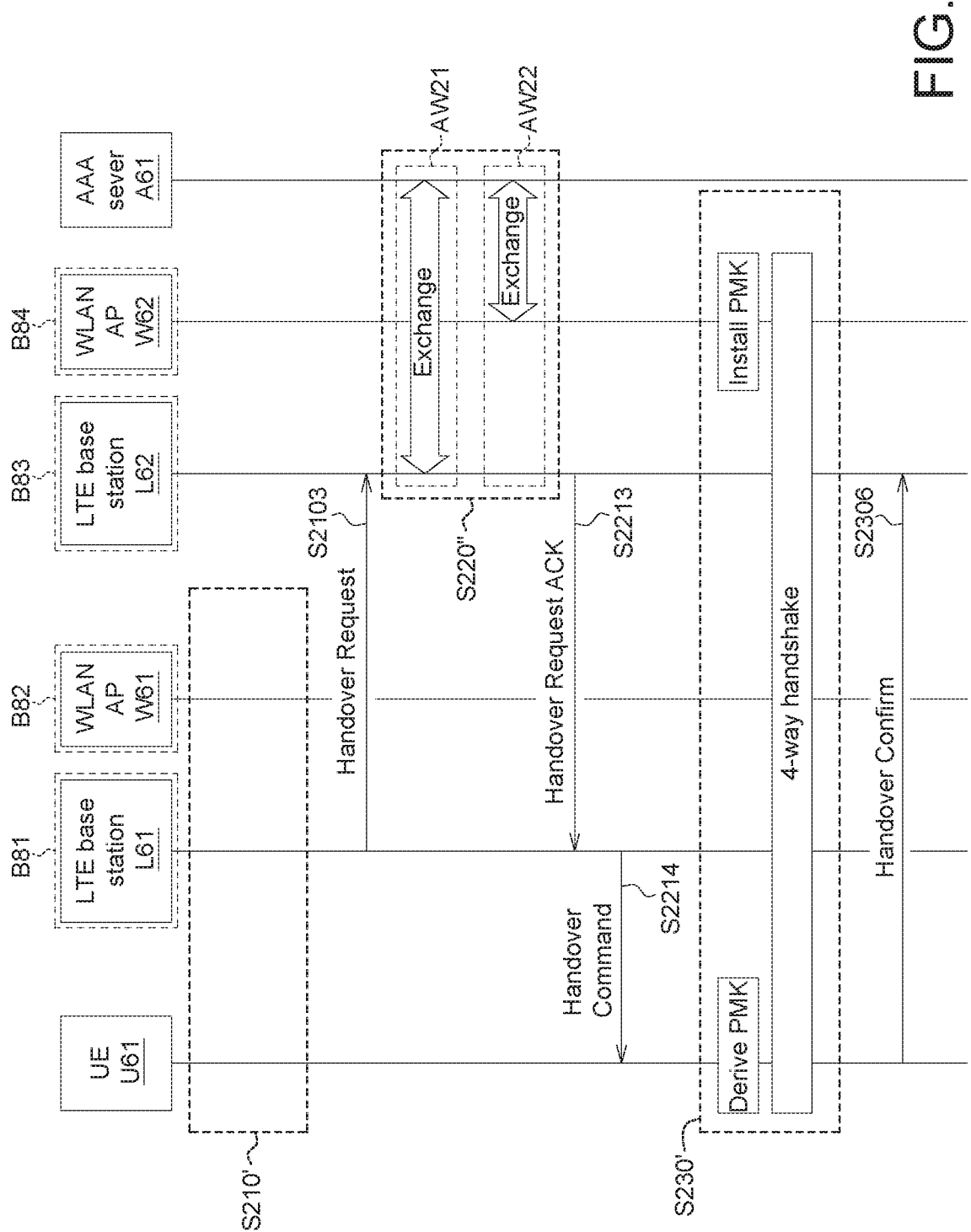
FIG. 8 shows that the mobility procedure of a WLAN AP and another WLAN AP is performed in the Dual Connectivity.

Please refer to FIG. 8, which shows that the mobility procedure of the WLAN AP W61, W62 is performed in the Dual Connectivity. In the Dual Connectivity, the LTE base station L61 is a master eNB B81, the WLAN AP W61 is a secondary eNB B82, the LTE base station L62 is a third eNB B83, and the WLAN AP W62 is a fourth eNB B84. In this disclosure, the eNB B83 or the eNB B84 assists the authentication procedure for the UE U61 and the WLAN AP W62.

In step S210', an information transfer is performed between the UE U61 and the WLAN AP W61 which is the secondary eNB B82. Next, in step S2103, the LTE base station L61 transmits a Handover Request to the LTE base station L62. The Handover Request includes the WLAN association information and the WLAN authentication information of the UE U61, an AP ID of the WLAN AP W61, and a channel and bandwidth information. In one embodiment, if the WLAN association information and the WLAN authentication information are stored in a Mobility Management Entity (MME), then the LTE base station L62 can ask the MME for the WLAN association information and the WLAN authentication information.

In step S220", the LTE base station L62 which is the third eNB B83 or the WLAN AP W62 which is the fourth eNB B84 assists the WLAN authentication procedure for the UE U61 with the AAA server A61. In the step S220", two alternative ways AW21 and AW22 can be chosen. In the alternative way AW21, the LTE base station L62 performs the WLAN authentication procedure; in the alternative way AW22, the LTE base station L62 assists the WLAN AP W62 to perform the WLAN authentication procedure. Next, in step S2213, the LTE base station L62 transmits a Handover Request ACK to the LTE base station L61. The Handover Request ACK includes an AP ID of the WLAN AP W62, a channel and bandwidth information, an association ID, and the MK. Next, in step S2214, the LTE base station L61 transmits a Handover Command to the UE U61 for performing the 4-way handshake. The Handover Command includes an AP ID of the WLAN AP W62, the channel and bandwidth information, the association ID and the MK.

In step S230', the LTE base station L62 which is the third eNB B83 commands the UE U61 to establish the WLAN link with the WLAN AP W62. Next, in step S2306, the UE U61 transmits a Handover Confirm the LTE base station L62.

While the disclosure has been described by way of example and in terms of the exemplary embodiment(s), it is to be understood that the disclosure is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A pre-association and pre-authentication method of a Long Term Evolution (LTE) base station in a WWAN-WLAN aggregation, wherein in a Carrier Aggregation (CA), the LTE base station is a primary cell of an Evolved Node B (eNB) and a WLAN access point (AP) is a secondary cell of the eNB, in a Dual Connectivity (DC), the LTE base station is a master eNB and the WLAN AP is a secondary eNB, and the pre-association and pre-authentication method of the LTE base station comprises:
   receiving a WLAN information from a user equipment (UE);
   performing, by the LTE base station, a WLAN authentication procedure for establishing a connection between the UE and an authentication, authorization, and accounting (AAA) server; and
   commanding the UE to establish a WLAN link with the WLAN AP;
   wherein in the step of performing the WLAN authentication procedure for establishing the connection between the UE and the AAA server, the LTE base station, instead of the UE, performs an exchange step with the AAA server by using the WLAN information;
   in the step of performing the WLAN authentication procedure for establishing the connection between the UE and the AAA server, the LTE base station sends a UE request message to indicate the UE to perform the WLAN authentication procedure with the AAA server, the LTE base station receives a UE response message in response to the UE request message, and the UE response message comprises an indication of completion of performing the WLAN authentication procedure, a master key (MK), and a pair-wise master key (PMK).

2. The pre-association and pre-authentication method of the LTE base station according to claim 1, wherein in the step of receiving the WLAN information from the UE, the WLAN information are received via a UE Capability Information message.

3. The pre-association and pre-authentication method of the LTE base station according to claim 1, wherein in the step of receiving the WLAN information from the UE, the WLAN information is transmitted in response to a WLAN enquiry message.

4. The pre-association and pre-authentication method of the LTE base station according to claim 3, wherein in the step of receiving the WLAN information from the UE, the WLAN enquiry message comprises an indication for asking WWAN-WLAN aggregation supporting, and the WLAN enquiry message is a UE capability enquiry message or a radio resource control (RRC) connection reconfiguration.

5. The pre-association and pre-authentication method of the LTE base station according to claim 1, wherein in the step of receiving the WLAN information from the UE, the WLAN information is a UE capability information message or a RRC connection reconfiguration complete message.

6. The pre-association and pre-authentication method of the LTE base station according to claim 1, wherein in the step of receiving the WLAN information from the UE, the WLAN information comprises at least one of a UE identification (ID), a network interface card (NIC) information, a network access identifier (NAI) information, a response of WWAN-WLAN aggregation supporting, a supported data rate, and an encryption type.

7. The pre-association and pre-authentication method of the LTE base station according to claim 1, wherein in the step of performing the WLAN authentication procedure for establishing the connection between the UE and the AAA server, the UE request message comprises at least one of an indication of performing the WLAN authentication procedure, and an AP identification (ID).

8. The pre-association and pre-authentication method of the LTE base station according to claim 1, wherein in the step of performing the WLAN authentication procedure for establishing the connection between the UE and the AAA server, the LTE base station obtains at least one of the MK and the PMK after the WLAN authentication procedure.

9. The pre-association and pre-authentication method of the LTE base station according to claim 8, wherein in the step of performing the WLAN authentication procedure for establishing the connection between the UE and the AAA server, the LTE base station sends a WLAN request message to the WLAN AP for installing the PMK, and the WLAN request message comprises at least one of a network interface card (NIC) information, the MK, and the PMK.

10. The pre-association and pre-authentication method of the LTE base station according to claim 9, wherein in the step of performing the WLAN authentication procedure for establishing the connection between the UE and the AAA server, the LTE base station receives a WLAN response message from the WLAN AP, and the WLAN response message comprises an association identification (ID).

11. The pre-association and pre-authentication method of the LTE base station according to claim 1, wherein in the step of performing the WLAN authentication procedure for establishing the connection between the UE and the AAA server, the LTE base station indicates the WLAN AP to perform the WLAN authentication procedure with the AAA server or to install the PMK by using a WLAN addition message,
   the WLAN addition message comprises at least one of an indication of performing the WLAN authentication procedure, a UE identification (ID), an AP identification (ID), a bandwidth information, a network interface card (NIC) information, a network access identifier (NAI) information, the MK, and the PMK.

12. The pre-association and pre-authentication method of the LTE base station according to claim 11, wherein in the step of performing the WLAN authentication procedure for establishing the connection between the UE and the AAA server, the LTE base station receives a WLAN acknowledge message in response to the WLAN addition message.

13. The pre-association and pre-authentication method of the LTE base station according to claim 12, wherein in the step of performing the WLAN authentication procedure for establishing the connection between the UE and the AAA server, the WLAN acknowledge message comprises at least one of the AP identification (ID), the bandwidth information, an association identification (ID), the MK, and the PMK.

14. The pre-association and pre-authentication method of the LTE base station according to claim 1, wherein in the step of commanding the UE to establish the WLAN link with the WLAN AP, the LTE base station sends a command message to the UE for installing the PMK, releasing, or establishing the WLAN link with the WLAN AP, and the command message comprises at least one of the MK, an AP identification (ID) to be established, an AP identification (ID) to be released, a channel information, and an association identification (ID).

15. The pre-association and pre-authentication method of the LTE base station according to claim 14, wherein in the step of commanding the UE to establish the WLAN link with the WLAN AP, in case of releasing the WLAN link with the WLAN AP, the LTE base station sends a release request message to the WLAN AP, and the release request message comprises at least one of an indication to release, the AP identification (ID), and a UE identification (ID).

16. The pre-association and pre-authentication method of the LTE base station according to claim 14, wherein in the step of commanding the UE to establish the WLAN link with the WLAN AP, the command message is a radio resource control (RRC) connection reconfiguration.

17. The pre-association and pre-authentication method of the LTE base station according to claim 1, wherein in the step of performing the WLAN authentication procedure for establishing the connection between the UE and the AAA server, during a handover procedure, the LTE base station send a handover request message to another LTE base station, and the handover request message comprises at least one of a UE identification (ID), an AP identification (ID), a channel information identification (ID), a network access identifier (NAI) information, a network interface card (NIC) information, and a bandwidth information.

18. The pre-association and pre-authentication method of the LTE base station according to claim 17, wherein in the step of performing the WLAN authentication procedure for establishing the connection between the UE and the AAA server, during the handover procedure, the LTE base station receives a handover response message from another LTE base station in response to the handover request message, and the handover response message comprises at least one of a target AP identification (ID), the channel information identification (ID), the MK, an association identification (ID), and a bandwidth information.

19. A Long Term Evolution (LTE) base station in a WWAN-WLAN Aggregation, wherein
   in a Carrier Aggregation (CA), the LTE base station is a primary cell of an Evolved Node B (eNB) and a WLAN access point (AP) is a secondary cell of the eNB; in a Dual Connectivity (DC), the LTE base station is a master eNB and the WLAN AP is a secondary eNB
   the LTE base station is configured to receive a WLAN information from a user equipment (UE),
   the LTE base station, instead of the UE, is further configured to perform an exchange step of a WLAN authentication procedure for establishing a connection between the UE and an authentication, authorization, and accounting (AAA) server, and
   the LTE base station is further configured to command the UE to establish a WLAN link with the WLAN AP,
   wherein the LTE base station is further configured to indicate that the UE is to perform the WLAN authentication procedure with the AAA server, forward an authentication message between the UE and the AAA server, obtain a pair-wise master key (PMK), send the PMK to the WLAN AP, and get an association identification (ID) from the WLAN AP.

20. The LTE base station according to claim 19, wherein the WLAN information are received via a UE Capability Information message.

21. The LTE base station according to claim 19, wherein the WLAN information includes a network interface card (NIC) information and a network access identifier (NAI) information.

22. The LTE base station according to claim 19, wherein the LTE base station is configured to send a pair-wise master key (PMK) to the WLAN AP.

23. The LTE base station according to claim 19, wherein the LTE base station is further configured to indicate the WLAN AP to perform the WLAN authentication procedure with the AAA server, and obtain a pair-wise master key (PMK).

24. The LTE base station according to claim 19, wherein the LTE base station is further configured to indicate the UE to perform the WLAN authentication procedure with the AAA server, forward an authentication message between the UE and the AAA server, and obtain a pair-wise master key (PMK).

25. The LTE base station according to claim 19, wherein the LTE base station is configured to send a target AP identification (ID), a channel information and an association identification (ID) to the UE, and send a master key (MK) to the UE.

26. A pre-association and pre-authentication method of a user equipment (UE) in a WWAN-WLAN Aggregation, wherein in a Carrier Aggregation (CA), a Long Term Evolution (LTE) base station is a primary cell of an Evolved Node B (eNB) and a WLAN access point (AP) is a secondary cell of the eNB, in a Dual Connectivity (DC), the LTE base station is a master eNB and the WLAN AP is a secondary eNB, and the pre-association and pre-authentication method of the UE comprises:
  transferring a WLAN information to the LTE base station, wherein the WLAN information comprises at least one of a UE identification (ID), a network interface card (NIC) information, a network access identifier (NAI) information, a response of WWAN-WLAN aggregation supporting, a supported data rate, and an encryption type;
  receiving a command message from the LTE base station by the UE, wherein the command message comprises at least one of a master key (MK), an AP identification (ID) to be established, the AP identification (ID) to be released, a channel information, and an association identification (ID); and establishing a WLAN link with the WLAN AP, wherein the LTE base station sends the command message to the UE for installing a pair-wise master key (PMK), releasing, or establishing the WLAN link with the WLAN AP.

27. The pre-association and pre-authentication method of the UE according to claim 26, wherein in the step of transferring the WLAN information to the LTE base station, the WLAN information are transmitted via a UE Capability Information message.

28. The pre-association and pre-authentication method of the UE according to claim 26, wherein in the step of transferring the WLAN information to the LTE base station, the WLAN information is transmitted in response to a WLAN enquiry message, and the WLAN enquiry message comprises an indication for asking WWAN-WLAN aggregation supporting.

29. The pre-association and pre-authentication method of the UE according to claim 28, wherein in the step of in the step of transferring the WLAN information to the LTE base station, the WLAN enquiry message is a UE capability enquiry message or a radio resource control (RRC) connection reconfiguration.

30. The pre-association and pre-authentication method of the UE according to claim 26, wherein in the step of in the step of transferring the WLAN information to the LTE base station, the WLAN information is a UE capability information message or a RRC connection reconfiguration complete message.

31. The pre-association and pre-authentication method of the UE according to claim 26, wherein in the step of establishing the WLAN link with the WLAN AP, in case of releasing the WLAN link with the WLAN AP, the LTE base station sends a release request message to the WLAN AP, and the release request message comprises at least one of an indication to release, the AP identification (ID), and a UE identification (ID).

32. The pre-association and pre-authentication method of the UE according to claim 26, wherein in the step of receiving the command message from the LTE base station by the UE, the command message is a radio resource control (RRC) connection reconfiguration.

33. A user equipment (UE) in a WWAN-WLAN Aggregation, wherein in a Carrier Aggregation (CA), a Long Term Evolution (LTE) base station is a primary cell of an Evolved Node B (eNB) and a WLAN access point (AP) is a secondary cell of the eNB, and in a Dual Connectivity (DC), the LTE base station is a master eNB and the WLAN AP is a secondary eNB;
  the UE is configured to transfer a WLAN information to the LTE base station for the LTE base station, instead of the UE, to perform an exchange step of a WLAN authentication procedure for establishing a connection between the UE and an authentication, authorization, and accounting (AAA) server by using the WLAN information, wherein the LTE base station sends a UE request message to indicate that the UE is to perform the WLAN authentication procedure with the AAA server, the LTE base station receives an UE response message in response to the UE request message, and the UE response message comprises an indication of completion of performing the WLAN authentication procedure, a master key (MK), and a pair-wise master key (PMK); and
  the UE is further configured to establish a WLAN link with the WLAN AP.

34. The UE according to claim 33, wherein the WLAN information are transmitted via a UE Capability Information message.

35. The UE according to claim 33, wherein the WLAN information includes a network interface card (NIC) information.

36. The UE according to claim 33, wherein the WLAN information includes a network access identifier (NAI) information.

37. The UE according to claim 33, wherein the UE is configured to receive a target AP identification (ID), a channel information and an association identification (ID) from the LTE base station.

* * * * *